(12) United States Patent
Watt

(10) Patent No.: US 10,254,979 B1
(45) Date of Patent: Apr. 9, 2019

(54) RELOCATING OR ABORTING A BLOCK OF DATA BY A HOST, BASED ON MEDIA POLICIES MANAGED BY A STORAGE DEVICE

(71) Applicant: INTEL CORPORATION, Santa Clara, CA (US)

(72) Inventor: Brennan A. Watt, Boulder, CO (US)

(73) Assignee: INTEL CORPORATION, Santa Clara, CA (US)

( * ) Notice: Subject to any disclaimer, the term of this patent is extended or adjusted under 35 U.S.C. 154(b) by 2 days.

(21) Appl. No.: 15/719,444

(22) Filed: Sep. 28, 2017

(51) Int. Cl.
*G06F 12/02* (2006.01)
*G06F 3/06* (2006.01)

(52) U.S. Cl.
CPC ............ *G06F 3/0616* (2013.01); *G06F 3/064* (2013.01); *G06F 3/0649* (2013.01); *G06F 3/0659* (2013.01); *G06F 3/0679* (2013.01); *G06F 12/0246* (2013.01)

(58) Field of Classification Search
None
See application file for complete search history.

(56) References Cited

U.S. PATENT DOCUMENTS 9,146,855 B2 * 9/2015 Lambert ............. G06F 12/0246

OTHER PUBLICATIONS

NVM Exress, "NVM Express", Revision 1.3, May 1, 2017, 282 pp.

* cited by examiner

*Primary Examiner* — Brian R Peugh
(74) *Attorney, Agent, or Firm* — Konrad Raynes Davda & Victor LLP; Rabindranath Dutta

(57) ABSTRACT

A storage device transmits a message to a host, where the message indicates that at an opportune time the host should relocate or abort a block of data that is stored in the storage device. The storage receives a command from the host, to relocate or abort the block of data stored in the storage device.

25 Claims, 9 Drawing Sheets

US 10,254,979 B1

RELOCATING OR ABORTING A BLOCK OF DATA BY A HOST, BASED ON MEDIA POLICIES MANAGED BY A STORAGE DEVICE

BACKGROUND

A solid state drive (SSD) is a data storage device that uses integrated circuit assemblies as memory to store data persistently. SSDs have no moving mechanical components and this distinguishes SSDs from traditional electromechanical magnetic disks, such as, hard disk drives (HDDs) or floppy disks, which contain spinning disks and movable read/write heads. Compared to electromechanical disks, SSDs are typically more resistant to physical shock, run silently, have lower access time, and less latency. Many types of SSDs use NAND-based flash memory which comprises an electronic (solid-state) non-volatile computer storage medium that can be electrically erased and reprogrammed.

SSDs are different from HDDs in how they wear in comparison to HDDs. SSDs have a service lifetime that is a function of the number of write operations (known as program/erase cycles) that the NAND-based flash memory is able to endure. Techniques for wear leveling may be used to prolong the service lifetime of SSDs. In certain techniques for wear leveling, erasures and re-writes are distributed evenly across the NAND-based flash memory of the SSD, via mechanisms such as background data movements. In this way, no single erase block of the NAND-based flash memory prematurely fails due to a high concentration of write cycles.

The uncorrectable bit error rate (UBER) for a SSD is the number of data errors per number of bits read. The UBER for a SSD may increase with the age of the SSD.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A direct placement SSD is a type of SSD in which a host computational device (referred to as host) is configurable to manage the placement, movement, and deletion of data in the direct placement SSD.

The direct placement SSD may have policies in place for background data movements, in order to perform wear leveling and decrease UBER (i.e., uncorrectable bit errors) in the direct placement SSD. It is possible for the direct placement SSD to provide details of the policies to the host to perform wear leveling and decrease UBER via operations performed by the host on the direct placement SSD. However, such policies may be specific for each type of direct placement SSD and if such policies are used by the host, then adoption of such policies by the host may require integration with each new generation or version of direct placement SSD, and the performance of the host may be impacted by the processor cycles needed to manage such integration. However, if all the policies are kept internal to the direct placement SSD and not shared with the host, then the latencies in the direct placement SSD may be impacted because resources of the direct placement SSD may be tied up in performing internal data movement operations, and operations performed by the host on the SSD may be serialized behind these internal data movement operations.

Certain embodiments retain the complexity of managing and tracking the policies in the direct placement SSD, but allows the host to control the background data movements in the direct placement SSD. The direct placement SSD determines the blocks to move or abort to satisfy the policies, and sends one or more messages to the host to indicate the blocks to move or abort. In response, the host moves or aborts the blocks at an opportune time in the direct placement SSD, such as when the host has spare processor cycles or when the usage of the direct control SSD is low enough for background data movements to take place without impacting other operations of the direct control SSD. Therefore the host is provided with an adequate amount of control for achieving wear leveling and managing UBER without being provided with the complete details of the policies of the direct placement SSD.

Therefore, certain embodiments provide mechanisms for improvement of endurance and reduction of UBER on direct placement SSDs without sacrificing latency and performance.

Figure 1:
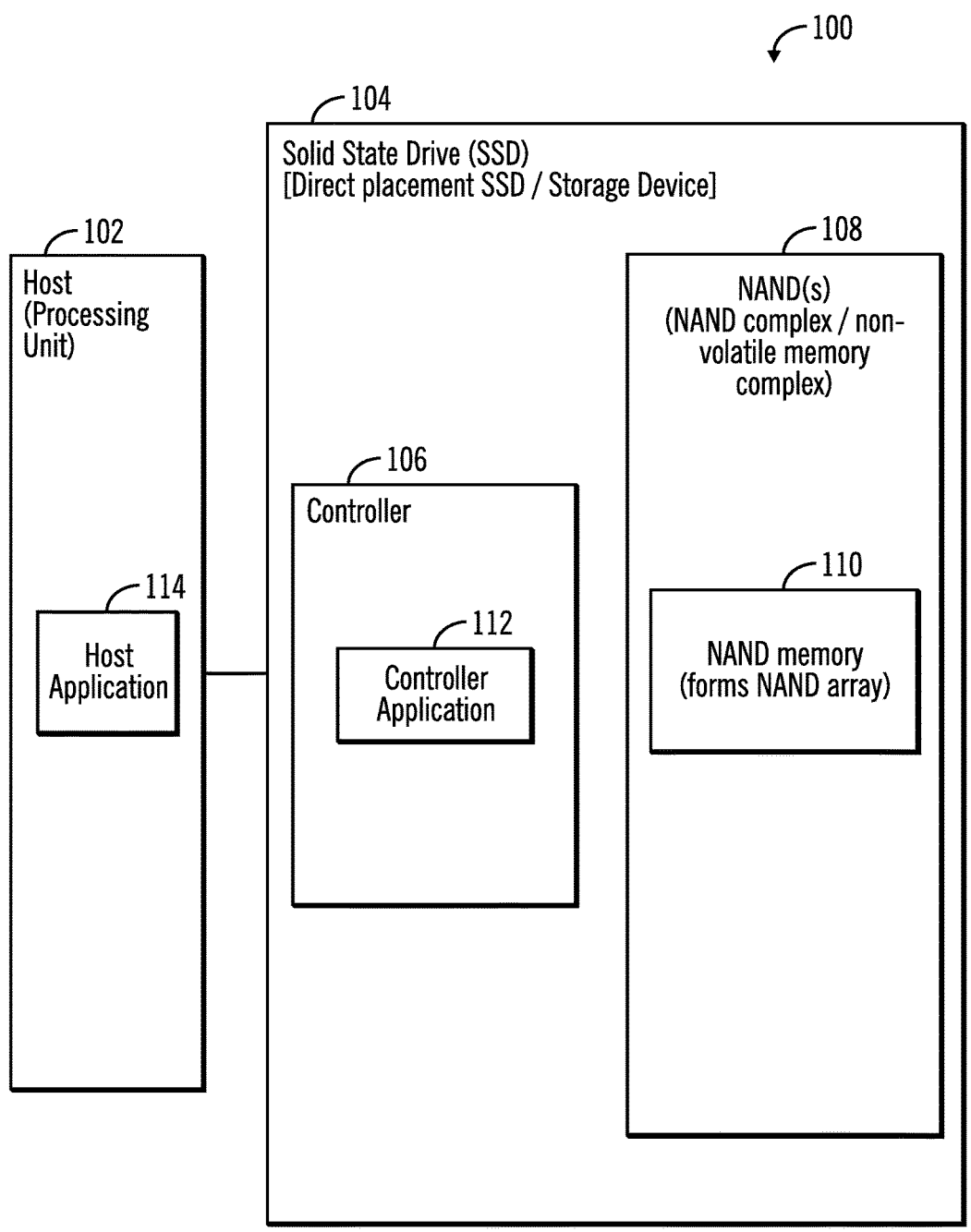
FIG. 1 illustrates a block diagram of a computing environment in which a host is coupled to a SSD comprised of NAND memory, in accordance with certain embodiments.

FIG. 1 illustrates a block diagram of a computing environment 100 in which a host 102 is coupled to a SSD 104, in accordance with certain embodiments. In certain embodiments the SSD may be a direct placement SSD. The SSD 104 may be comprised of a controller 106 and a NAND complex 108. The NAND complex 108 may also be referred to as a non-volatile memory complex that is comprised of a plurality of non-volatile memory modules that are directly or indirectly coupled, i.e., the non-volatile memory modules that are directly or indirectly coupled form a complex that is referred to as a non-volatile memory complex.

In certain embodiments, the NAND complex 108 may be comprised of a plurality of NAND memory 110 that may form a NAND array. In certain embodiments the NAND complex 108 comprise a single-level cell (SLC) NAND, a multi-level cell (MLC) NAND, a triple-level cell (TLC) NAND, a quad-level cell (QLC) NAND or any other type of NAND or any other type of non-volatile memory complex. In other embodiments, the SSD 104 may be comprised of a controller 106 that controls certain other types of non-volatile memory, such as NOR memory or some other suitable non-volatile memory. Non-volatile memory is a storage medium that does not require power to maintain the state of data stored by the medium. Nonlimiting examples of nonvolatile memory may include any or a combination of: solid state memory [such as planar or three Dimensional (3D) NAND flash memory or NOR flash memory], 3D crosspoint memory, storage devices that use chalcogenide phase change material (e.g., chalcogenide glass), byte addressable nonvolatile memory devices, multi-threshold level NAND flash memory, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), magnetic storage memory, single or multi-level Phase Change Memory (PCM), a resistive memory, nanowire memory, anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device. In some embodiments, 3D crosspoint memory may comprise a transistor-less stackable cross point architecture in which memory cells sit at the intersection of words lines and bit lines and are individually addressable and in which bit storage is based on a change in bulk resistance. A memory device may refer to the die itself and/or to a packaged memory product. In certain embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org). In certain embodiments, the SSD 104 may be capable of storing several terabytes of data or more.

In certain embodiments, the controller 106 of the SSD 104 may include a controller application 112, where the controller application 112 is implemented in hardware, firmware, software, or any combination thereof.

In certain embodiments, the host 102 (also referred to as a processing unit) may be comprised of any suitable computational device, such as a personal computer, a mainframe, a telephony device, a smart phone, a storage controller, a blade computer, a processor with memory, etc. In certain embodiments, the host 102 may communicate with the SSD 104 over a bus (such as a Peripheral Component Interconnect (PCIe), Serial Advanced Technology Attachment (SATA), Serial Attached Small Computer System Interface (SAS)) or a network, such as the Internet, a storage area network (SAN), a local area network (LAN). In certain embodiments, the host 102 may communicate with the SSD 104 via a Non-Volatile Memory Express (NVMe) interface (http://www.nvmexpress.org). In certain embodiments, a host application 114 that is implemented in software, firmware, hardware, or any combination thereof may execute in the host 102.

Figure 2:
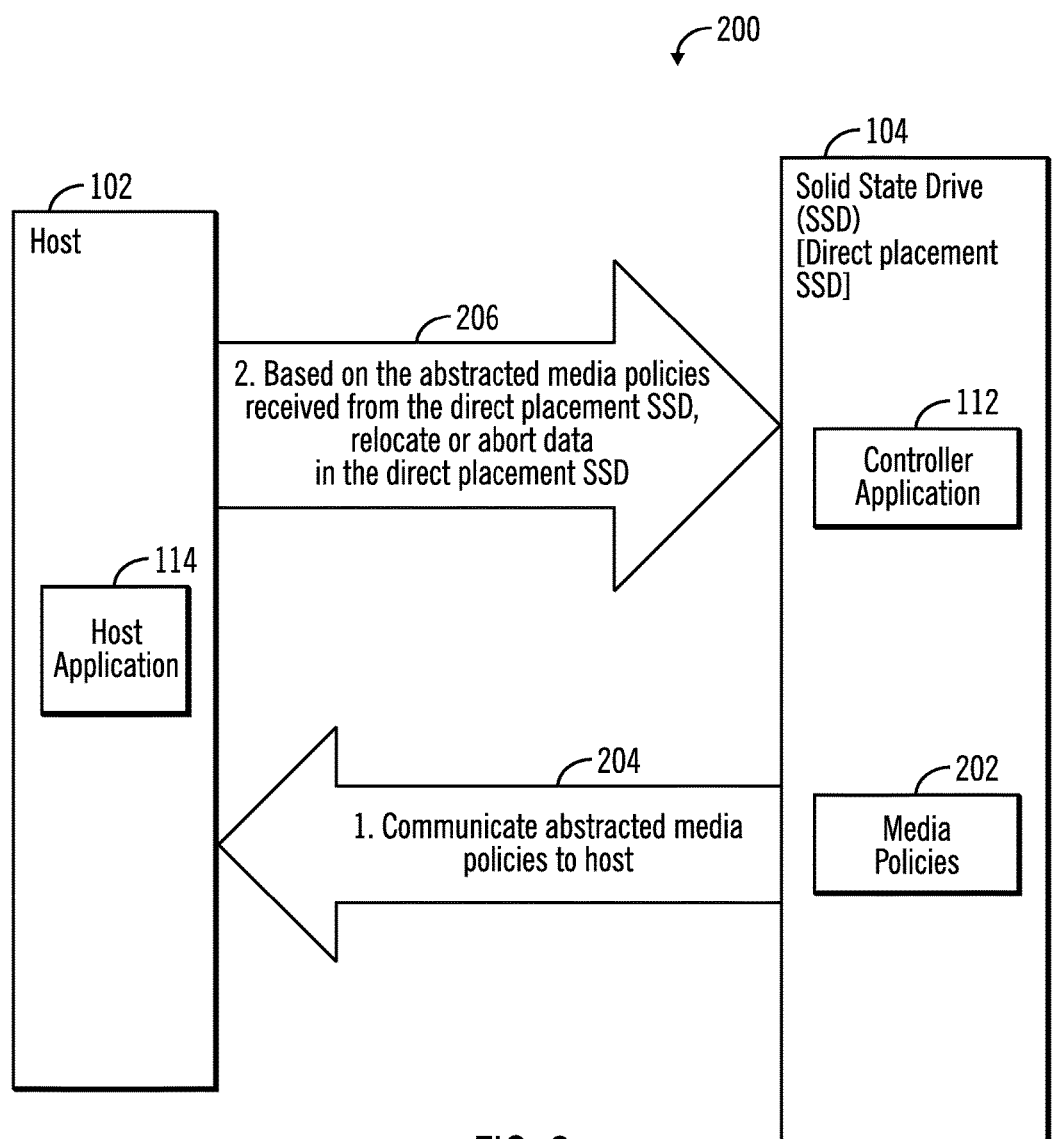
FIG. 2 illustrates a block diagram that shows how media policies are managed by the SSD and how abstracted media policies are communicated to the host from the SSD, in accordance with certain embodiments.

FIG. 2 illustrates a block diagram 200 that shows how media policies 202 are managed by the direct placement SSD 104 and how abstracted media policies are communicated to the host 102 from the direct placement SSD 104, in accordance with certain embodiments.

In certain embodiments, the media policies 202 maintained by the direct placement SSD 104 include a plurality of policies associated with the performing of operations to increase the lifespan of the direct placement SSD 104 and reduce LIBER in the direct placement SSD 104.

In certain embodiments, the controller application 112 may analyze the media policies 202, collect statistics on operations and storage of data in the direct placement SSD 104, and send a message 204 to the host 102 that includes abstracted data policies, where the abstracted data policies include blocks of data to relocate or abort in the direct placement SSD 104. Relocation of a block of data comprises reading the block of data and writing the data to a new block to refresh the data. Aborting a block of data comprises writing out the block completely and/or invalidating the entire block such that no content needs to be read from the block.

The host application 114 receives the abstracted media policies and based on the abstracted media policies, relocates or aborts data in the direct placement SSD 104 (as shown via reference numeral 206).

Figure 3:
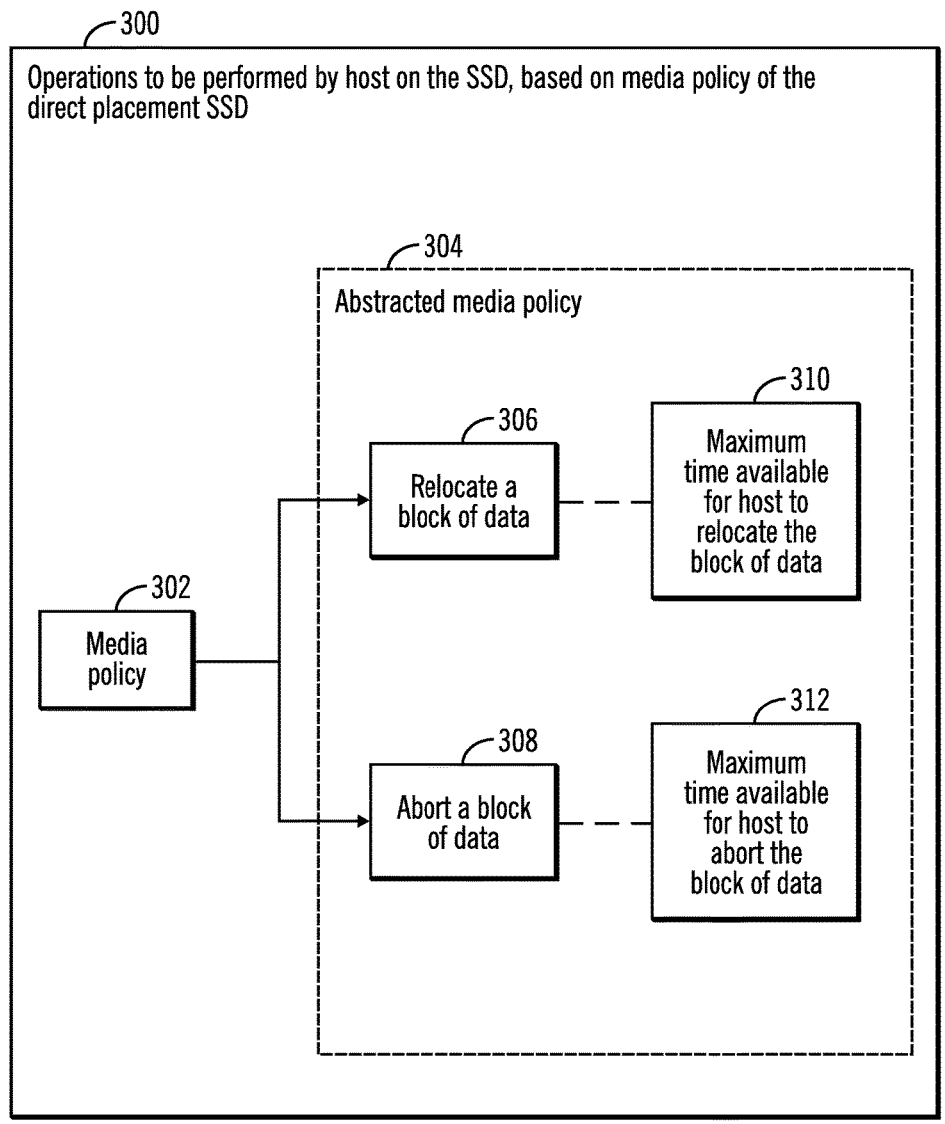
FIG. 3 illustrates a block diagram that shows examples of abstracted media policies communicated to the host from the SSD, in accordance with certain embodiments.

FIG. 3 illustrates a block diagram 300 that shows examples of abstracted media policies communicated to the host 102 from the direct placement SSD 104, in accordance with certain embodiments.

Based on an exemplary media policy 302 maintained in the direct placement SSD 104, the controller application 112 may generate an abstracted media policy 304. The abstracted media policy 304 may include an indication to relocate a block of data (shown via reference numeral 306) and an indication to abort a block of data (shown via reference numeral 308). The maximum time available for the host 102 to relocate the block of data (shown via reference numeral 310) and the maximum time available for the host 102 to abort the block of data (shown via reference numeral 312) are also included in the abstracted media policy 304.

Therefore, FIG. 3 illustrates certain embodiments in which the abstracted media policies communicated by the direct placement SSD 104 to the host 102 include indications for relocating or aborting one or more blocks of data.

Figure 4:
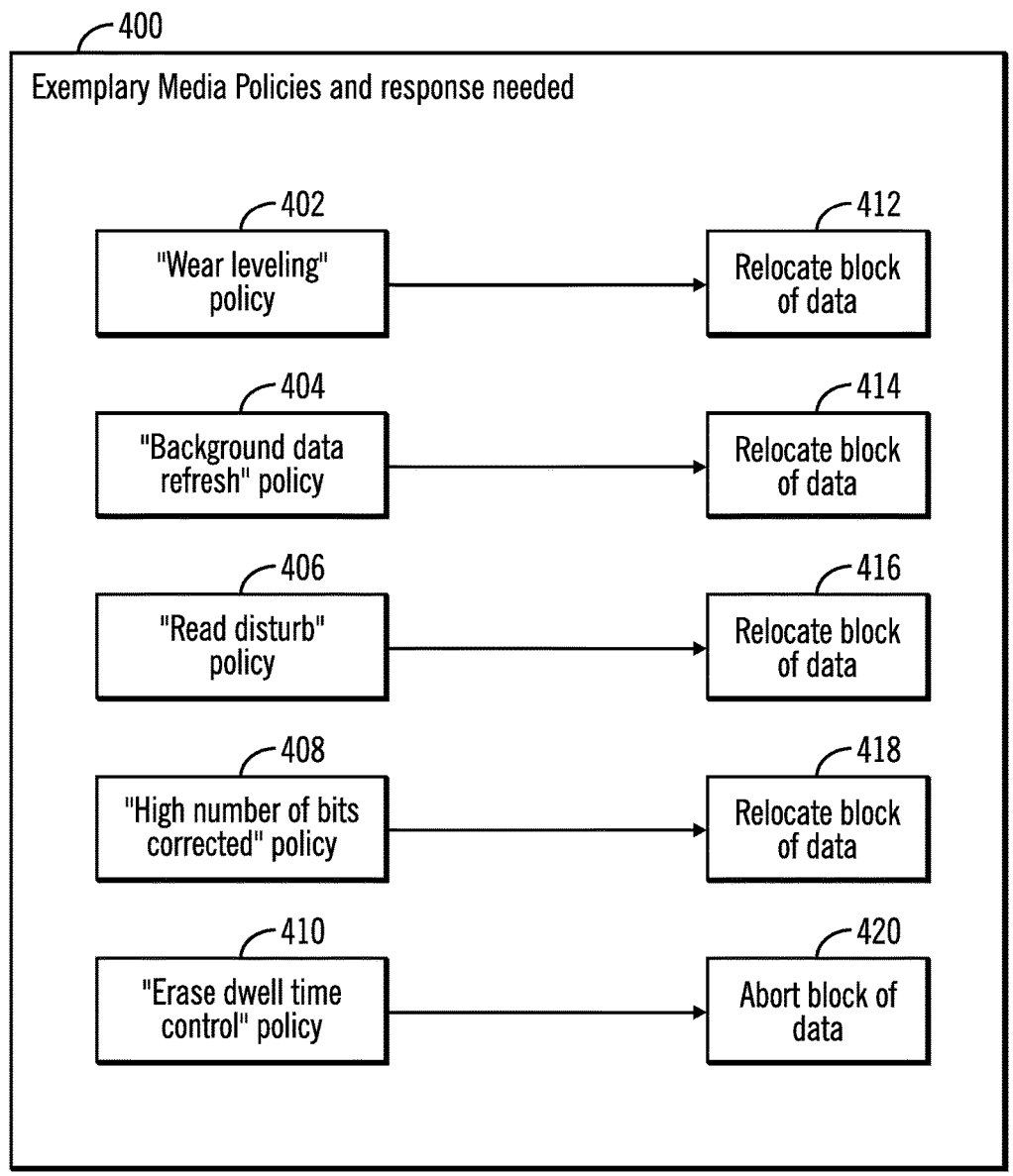
FIG. 4 illustrates a block diagram that shows exemplary media policies managed by the SSD, in accordance with certain embodiments.

FIG. 4 illustrates a block diagram 400 that shows exemplary media policies managed by the direct placement SSD 104, in accordance with certain embodiments. The exemplary media policies may include:

(1) A "wear leveling" policy to ensure that blocks are worn out evenly across the media instead of creating hot spots. The "wear leveling" policy elicits a relocate response when the wear difference between two blocks grows too large (as shown via reference numerals 402, 412);

(2) A "background data refresh" policy to ensure periodic refreshing of data to protect the data from charge loss. The "background data refresh" policy elicits a relocate response when age of a block becomes too old (as shown via reference numerals 404, 414);

(3) A "read disturb" policy to ensure relocation of data when reads have exceeded a certain threshold due to disturb effects on neighbors. The "read disturb" policy elicits a relocate response when read count on a block becomes too high (as shown via reference numerals 406, 416);

(4) A "high number of bits corrected" policy that determines whether for a specific read, a large number of bits required error-correcting code (ECC) correction. A "high number of bits corrected" policy elicits a relocate response if the number of bits corrected exceeds a predetermined threshold (as shown via reference numerals 408, 418); and (5) An "erase dwell time control" policy based on the fact that NAND survives longer when left in programmed state. The "erase dwell time control" policy elicits an abort response when part of a block has been left in an erased state too long (as shown via reference numerals 410, 420).

The media policies shown in FIG. 4 are exemplary, and other media policies may be included in the direct placement SSD 104 in other embodiments. However, no matter what the media policies, the abstracted media policies include indications of data in blocks to be relocated or aborted (as shown via reference numerals 412, 414, 416, 418, 420).

Figure 5:
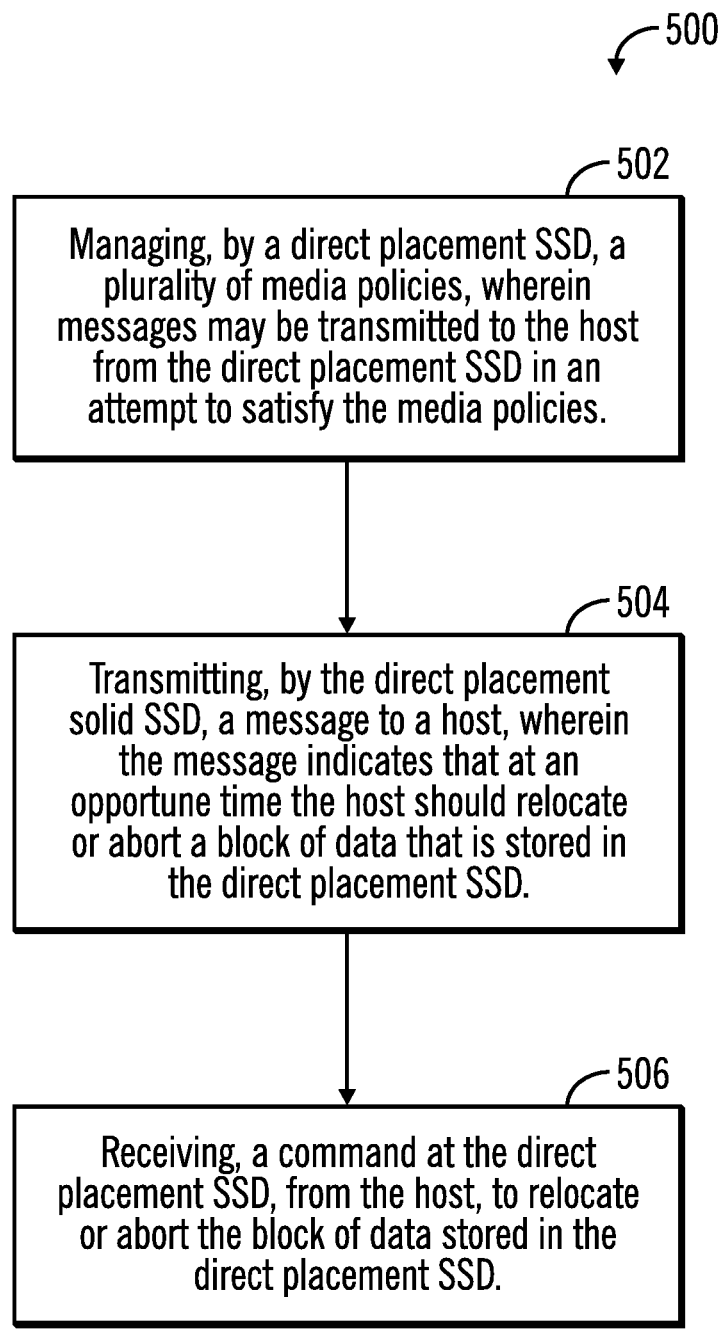
FIG. 5 illustrates a flowchart that shows operations to relocate or abort a block of data in a direct placement SSD, in accordance with certain embodiments.

FIG. 5 illustrates a flowchart 500 that shows operations to relocate or abort a block of data in a direct placement SSD, in accordance with certain embodiments. The operations shown in FIG. 5 may be performed by the controller application 112 that executes in the controller 106 of the direct placement SSD 104.

Control starts at block 502 in which a direct placement SSD 104 manages a plurality of media policies 402, 404, 406, 408, 410, where messages 204 may be transmitted to the host 102 from the direct placement SSD 104 in an attempt to satisfy the media policies 402, 404, 406, 408, 410.

From block 502 control proceeds to block 504 in which the direct placement SSD 104 transmits a message to a host 102, where the message indicates that at an opportune time the host 102 should relocate or abort a block of data that is stored in the direct placement SSD 104. The direct placement SSD 104 receives (at block 506) a command 206 from the host 102, to relocate or abort the block of data stored in the direct placement SSD 104.

Therefore, FIG. 5 illustrates certain embodiments in which the direct placement SSD 104 transmits a message to the host 102 with indications for data in blocks to be relocated or aborted, and the host 102 sends a command to the direct placement SSD 104 to relocate or abort the data in the blocks.

Figure 6:
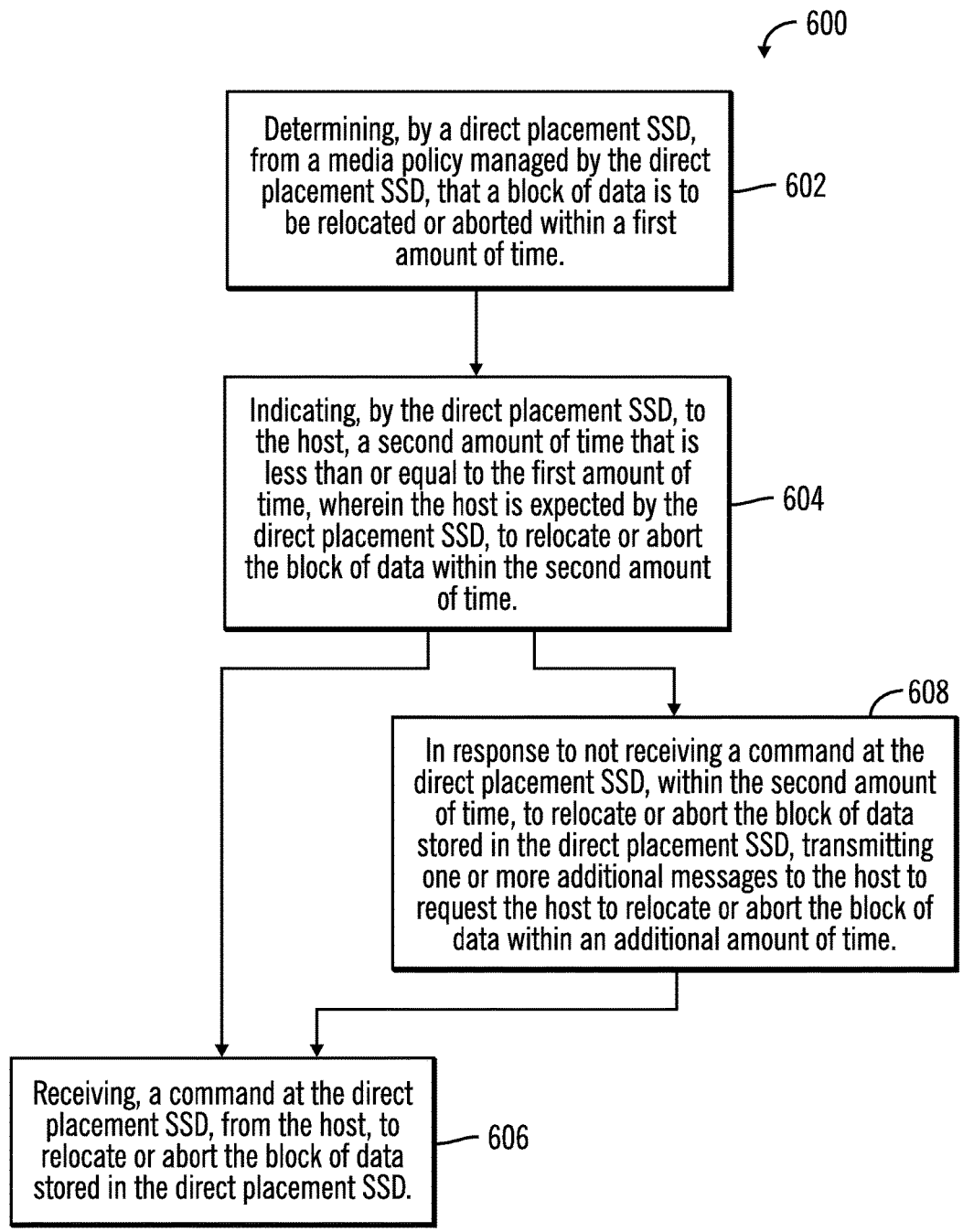
FIG. 6 illustrates a flowchart that shows operations to relocate or abort a block of data in a direct placement SSD within time durations indicated by the direct placement SSD to the host, in accordance with certain embodiments.

FIG. 6 illustrates a flowchart 600 that shows operations to relocate or abort a block of data in a direct placement SSD 104 within time durations indicated by the direct placement SSD 104 to the host 102, in accordance with certain embodiments. The operations shown in FIG. 6 may be performed by the controller application 112 that executes in the controller 106 of the direct placement SSD 104.

Control starts at block 602 in which a direct placement SSD 104 determines from a media policy managed by the direct placement SSD 104, that a block of data is to be relocated or aborted within a first amount of time (e.g. 50 seconds).

Control proceeds to block 604, in which the direct placement SSD 104 indicates to the host 102, a second amount of time (e.g., 20 seconds) that is less than or equal to the first amount of time, where the host 102 is expected by the direct placement SSD 104, to relocate or abort the block of data within the second amount of time.

From block 604 control may proceed in parallel to blocks 606 and 608. At block 606, the direct placement SSD 104 receive a command 206 from the host 102, to relocate or abort the block of data stored in the direct placement SSD 104. At block 608, if the direct placement SSD 104 does not receive a command within the second amount of time to relocate or abort the block of data stored in the direct placement SSD 104, then the direct placement SSD 104 transmits one or more additional messages to the host 102 to request the host 102 to relocate or abort the block of data within an additional amount of time (e.g., within 10 seconds), and then control may proceed to block 606.

Therefore, FIG. 6 illustrates certain embodiments, in which on receiving no command to relocate or abort data from the host 102 within a certain amount of time, the direct placement SSD 104 may send a plurality of warnings to the host 102, indicating an increasing levels of urgency to relocate or abort the block of data that is stored in the direct placement SSD 104. The increasing level of urgency may be indicated by reducing the time allowed for the host to relocate or abort the block of data.

Figure 7:
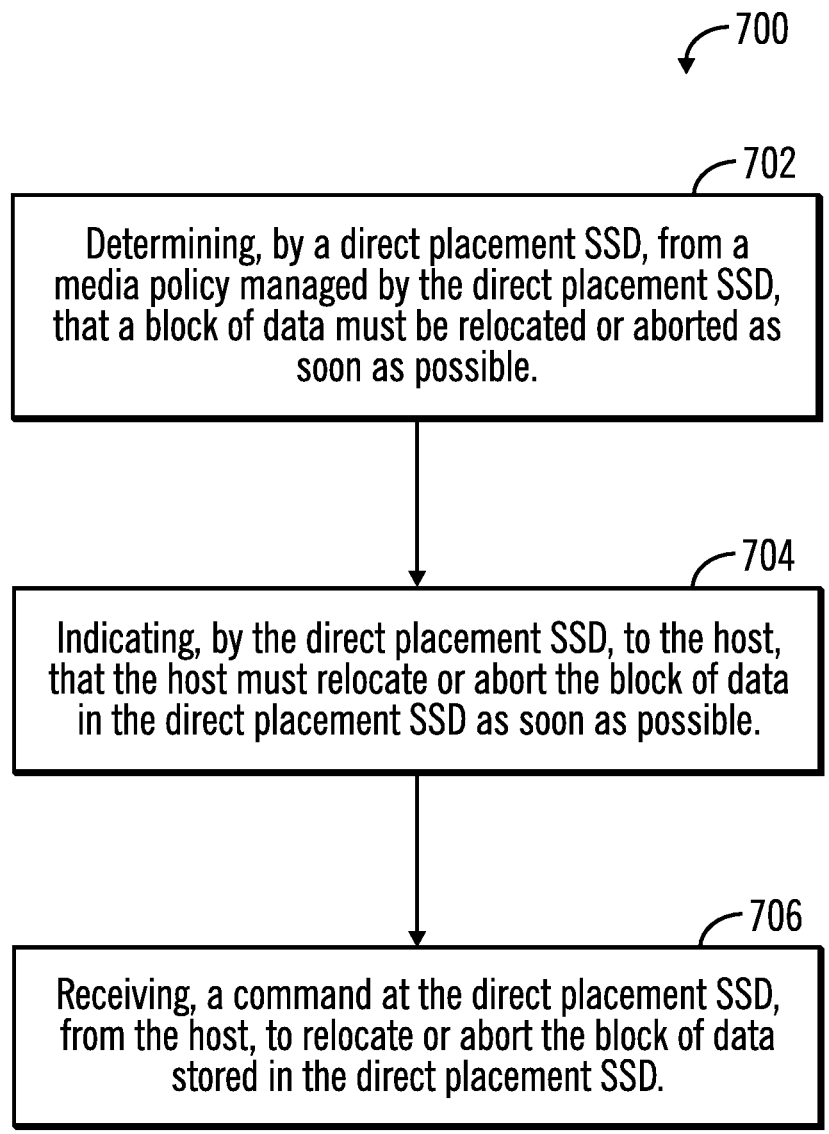
FIG. 7 illustrates a flowchart that shows operations to relocate or abort a block of data in a direct placement SSD as soon as possible, in accordance with certain embodiments.

FIG. 7 illustrates a flowchart 700 that shows operations to relocate or abort a block of data in a direct placement SSD 104 as soon as possible, in accordance with certain embodiments. The operations shown in FIG. 7 may be performed by the controller application 112 that executes in the controller 106 of the direct placement SSD 104.

Control starts at block 702 in which a direct placement SSD 104 determines from a media policy managed by the direct placement SSD 104 that a block of data must be relocated or aborted as soon as possible because the relocating or aborting of data has become a critical requirement for the direct placement SSD 104. The term "as soon as possible" may correspond to a small predetermined amount of time (e.g., 200 milliseconds).

From block 702 control proceeds to block 704, in which the direct placement SSD 104 indicates to the host 102, that the host 102 must relocate or abort the block of data in the direct placement SSD 104 as soon as possible. The direct placement SSD 104 receives (at block 706) a command from the host, to relocate or abort the block of data stored in the direct placement SSD 104.

Therefore, FIG. 7 illustrates an embodiment in which the need for data to be relocated or aborted has become critical for the functioning of the direct placement SSD 104, and the relocation or aborting of the data is performed substantially immediately (e.g., within 200 milliseconds) by the host 102.

Figure 8:
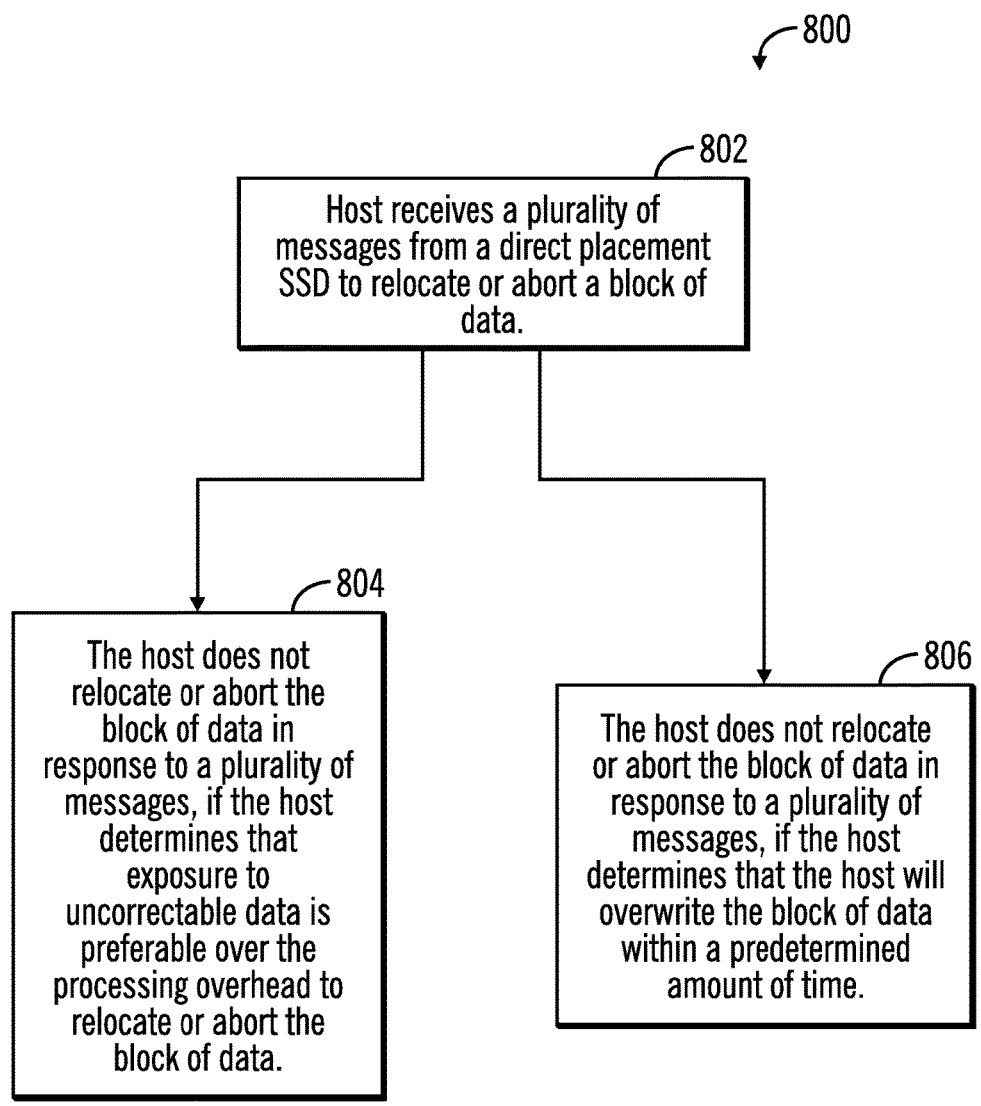
FIG. 8 illustrates a flowchart that shows operations performed by a host to determine when not to relocate or abort a block of data in a direct placement SSD, in accordance with certain embodiments.

FIG. 8 illustrates a flowchart 800 that shows operations performed by a host 102 to determine when not to relocate or abort a block of data in a direct placement SSD 104, in accordance with certain embodiments. The operations shown in FIG. 8 may be performed by the host application 114 that executes in the host 102.

Control starts at block 802 in which the host 102 receives a plurality of messages from a direct placement SSD 104 to relocate or abort a block of data. From block 802 control proceeds in parallel to block 804 and 806.

At block 804, the host 102 does not relocate or abort the block of data in response to a plurality of messages, if the host 102 determines that exposure to uncorrectable data is preferable over the processing overhead to relocate or abort the block of data. At block 806, the host 102 does not relocate or abort the block of data in response to a plurality of messages, if the host 102 determines that the host 102 will overwrite the block of data within a predetermined amount of time. In such a situation, there is no need to use the processing cycles needed to relocate or abort the block of data.

Therefore, FIGS. 1-8 illustrate certain embodiments that transfer the task of relocating and aborting of data to a host from a storage device (e.g., a direct placement SSD 104) based on media policies maintained in the storage device.

The described operations may be implemented as a method, apparatus or computer program product using standard programming and/or engineering techniques to produce software, firmware, hardware, or any combination thereof. The described operations may be implemented as code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of the flowchart and block diagrams may be implemented by computer program instructions.

Figure 9:
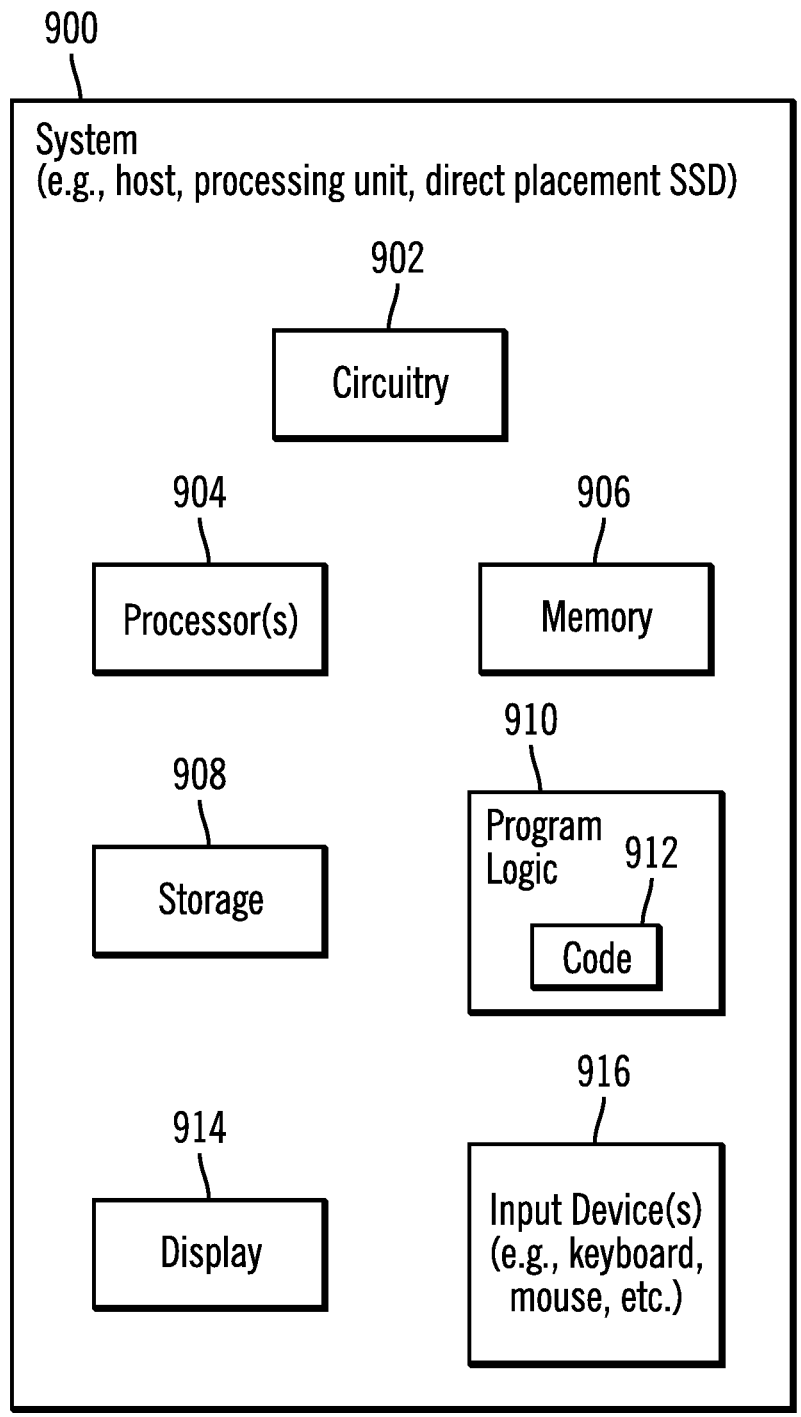
FIG. 9 illustrates a block diagram of a system, in accordance with certain embodiments.

FIG. 9 illustrates a block diagram of a system 900 that includes both the host 102 (the host 102 comprises at least a processor and may be referred to as a processing unit) and the direct placement solid state drive 104, in accordance with certain embodiments. For example, in certain embodiments the system 900 may be a computer (e.g., a laptop computer, a desktop computer, a tablet, a cell phone or any other suitable computational device) that has the host 102 and the direct placement solid state drive 104 both included in the system 900. For example, in certain embodiments the system 900 may be a laptop computer that includes the solid state drive 104. The system 900 may include a circuitry 902 that may in certain embodiments include at least a processor 904. The system 900 may also include a memory 906 (e.g., a volatile memory device), and storage 908. The storage 908 may include the solid state drive 104 or other drives or devices including a non-volatile memory device (e.g., EEPROM, ROM, PROM, flash, firmware, programmable logic, etc.). The storage 908 may also include a magnetic disk drive, an optical disk drive, a tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902. The system 900 may also include a display 914 (e.g., an liquid crystal display (LCD), a light emitting diode (LED) display, a cathode ray tube (CRT) display, a touchscreen display, or any other suitable display). The system 900 may also include one or more input devices 916, such as, a keyboard, a mouse, a joystick, a trackpad, or any other suitable input devices). Other components or devices beyond those shown in FIG. 9 may also be found in the system 900.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

EXAMPLES

The following examples pertain to further embodiments.

Example 1 is a method for data management, the method comprising: transmitting, by a storage device, a message to a host, wherein the message indicates that at an opportune time the host should relocate or abort a block of data that is stored in the storage device; and receiving, a command at the storage device, from the host, to relocate or abort the block of data stored in the storage device.

In example 2 the subject matter of example 1 may include that the storage device is a direct placement solid state drive (SSD), wherein the method further comprises: managing, by the direct placement SSD, a plurality of media policies, wherein the message that is transmitted to the host from the direct placement SSD is based on the media policies.

In example 3 the subject matter of example 2 may include: determining, by the direct placement SSD, from a media policy managed by the direct placement SSD that the block of data must be relocated or aborted as soon as possible; and indicating, by the direct placement SSD, to the host, that the host must relocate or abort the block of data in the direct placement SSD as soon as possible.

In example 4 the subject matter of example 3 may include that the opportune time for the host is as soon as possible after receiving an indication from the direct placement SSD that the host must relocate or abort the block of data in the direct placement SSD as soon as possible.

In example 5 the subject matter of example 2 may include: determining, by the direct placement SSD, from a media policy managed by the direct placement SSD, that the block of data is to be relocated or aborted within a first amount of time; and indicating, by the direct placement SSD, to the host, a second amount of time that is less than or equal to the first amount of time, wherein the host is expected by the direct placement SSD, to relocate or abort the block of data within the second amount of time.

In example 6 the subject matter of example 5 may include: in response to not receiving a command at the direct placement SSD, within the second amount of time, to relocate or abort the block of data stored in the direct placement SSD, transmitting one or more additional messages to the host to request the host to relocate or abort the block of data within an additional amount of time.

In example 7 the subject matter of example 2 may include that the media policies include management of wear leveling, background data refreshing, limiting of read disturbs, limiting of error correcting code based correction of bits, and controlling of erase dwell time.

In example 8 the subject matter of example 2 may include that the storage device is a direct placement solid state drive (SSD), wherein the method further comprises: transmitting, by the direct placement SSD to the host, a plurality of messages indicating an increasing levels of urgency to relocate or abort the block of data that is stored in the direct placement SSD.

In example 9 the subject matter of example 8 may include that the host does not relocate or abort the block of data in response to the plurality of messages, if the host determines that exposure to uncorrectable data is preferable over a processing overhead to relocate or abort the block of data.

In example 10 the subject matter of example 8 may include that the host does not relocate or abort the block of data in response to the plurality of messages, if the host determines that the host will overwrite the block of data within a predetermined amount of time.

Example 11 is a non-volatile memory device for data management, the non-volatile memory device comprising: a non-volatile memory; and a controller coupled to the non-volatile memory, wherein the controller is operable to: transmit a message to a host, wherein the message indicates that at an opportune time the host should relocate or abort a block of data that is stored in the non-volatile memory; and receive, a command from the host, to relocate or abort the block of data stored in the non-volatile memory.

In example 12 the subject matter of example 11 may include that the controller is further operable to: manage a plurality of media policies, wherein the message that is transmitted to the host is based on the media policies.

In example 13 the subject matter of example 12 may include that the controller is operable to: determine from a media policy managed by the non-volatile memory that the block of data must be relocated or aborted as soon as possible; and indicate to the host, that the host must relocate or abort the block of data in the non-volatile memory as soon as possible.

In example 14 the subject matter of example 13 may include that the opportune time for the host is as soon as possible after receiving an indication that the host must relocate or abort the block of data in the non-volatile memory as soon as possible.

In example 15 the subject matter of example 12 may include that the controller is further operable to: determine from a media policy that the block of data is to be relocated or aborted within a first amount of time; an indicate to the host, a second amount of time that is less than or equal to the first amount of time, wherein the host is expected to relocate or abort the block of data within the second amount of time.

In example 16 the subject matter of example 15 may include that the controller is further operable to: in response to not receiving a command within the second amount of time, to relocate or abort the block of data stored in the non-volatile memory, transmit one or more additional messages to the host to request the host to relocate or abort the block of data within an additional amount of time.

In example 17 the subject matter of example 12 may include that the media policies include management of wear leveling, background data refreshing, limiting of read disturbs, limiting of error correcting code based correction of bits, and controlling of erase dwell time.

In example 18 the subject matter of example 11 may include that the controller is further operable to: transmit a plurality of messages indicating an increasing levels of urgency to relocate or abort the block of data that is stored in the non-volatile memory.

In example 19 the subject matter of example 18 may include that the host does not relocate or abort the block of data in response to the plurality of messages, if the host determines that exposure to uncorrectable data is preferable over a processing overhead to relocate or abort the block of data.

In example 20 the subject matter of example 18 may include that the host does not relocate or abort the block of data in response to the plurality of messages, if the host determines that the host will overwrite the block of data within a predetermined amount of time.

Example 21 is a system for data management, the system comprising: a processing unit; a display; a non-volatile memory device comprising a non-volatile memory; and a controller coupled to the non-volatile memory, wherein the controller is operable to: transmit a message to the processing unit, wherein the message indicates that at an opportune time the processing unit should relocate or abort a block of data that is stored in the non-volatile memory; and receive a command from the processing unit, to relocate or abort the block of data stored in the non-volatile memory.

In example 22 the subject matter of example 21 may include that the controller is further operable to: manage a plurality of media policies, wherein the message that is transmitted to the processing unit is based on the media policies.

In example 23 the subject matter of example 22 may include that the controller is operable to: determine from a media policy managed by the non-volatile memory that the block of data must be relocated or aborted as soon as possible; and indicate to the processing unit that the processing unit must relocate or abort the block of data in the non-volatile memory as soon as possible.

In example 24 the subject matter of example 22 may include that the controller is further operable to: determine from a media policy that the block of data is to be relocated or aborted within a first amount of time; and indicate to the processing unit, a second amount of time that is less than or equal to the first amount of time, wherein the processing unit is expected to relocate or abort the block of data within the second amount of time.

In example 25 the subject matter of example 22 may include that the media policies include management of wear leveling, background data refreshing, limiting of read disturbs, limiting of error correcting code based correction of bits, and controlling of erase dwell time.

Example 26 is a system for data management, the system comprising: means for transmitting, by a storage device, a message to a host, wherein the message indicates that at an opportune time the host should relocate or abort a block of data that is stored in the storage device; and means for receiving, a command at the storage device, from the host, to relocate or abort the block of data stored in the storage device.

All optional features of any of the systems and/or apparatus described above may also be implemented with respect to the method or process described above, and specifics in the examples may be used anywhere in one or more embodiments. Additionally, all optional features of the method or process described above may also be implemented with respect to any of the system and/or apparatus described above, and specifics in the examples may be used anywhere in one or more embodiments.

What is claimed is:

1. A method, comprising:
    transmitting, by a storage device, a message to a host, wherein the message indicates that at an opportune time the host should relocate or abort a block of data that is stored in the storage device; and
    receiving, a command at the storage device, from the host, to relocate or abort the block of data stored in the storage device.

2. The method of claim 1, wherein the storage device is a direct placement solid state drive (SSD), the method further comprising:
    managing, by the direct placement SSD, a plurality of media policies, wherein the message that is transmitted to the host from the direct placement SSD is based on the media policies.

3. The method of claim 2, the method further comprising:
    determining, by the direct placement SSD, from a media policy managed by the direct placement SSD that the block of data must be relocated or aborted as soon as possible; and
    indicating, by the direct placement SSD, to the host, that the host must relocate or abort the block of data in the direct placement SSD as soon as possible.

4. The method of claim 3, wherein the opportune time for the host is as soon as possible after receiving an indication from the direct placement SSD that the host must relocate or abort the block of data in the direct placement SSD as soon as possible.

5. The method of claim 2, the method further comprising:
    determining, by the direct placement SSD, from a media policy managed by the direct placement SSD, that the block of data is to be relocated or aborted within a first amount of time; and
    indicating, by the direct placement SSD, to the host, a second amount of time that is less than or equal to the first amount of time, wherein the host is expected by the direct placement SSD, to relocate or abort the block of data within the second amount of time.

6. The method of claim 5, the method further comprising:
    in response to not receiving a command at the direct placement SSD, within the second amount of time, to relocate or abort the block of data stored in the direct placement SSD, transmitting one or more additional messages to the host to request the host to relocate or abort the block of data within an additional amount of time.

7. The method of claim 2, wherein the media policies include management of wear leveling, background data refreshing, limiting of read disturbs, limiting of error correcting code based correction of bits, and controlling of erase dwell time.

8. The method of claim 1, wherein the storage device is a direct placement solid state drive (SSD), the method further comprising:
    transmitting, by the direct placement SSD to the host, a plurality of messages indicating an increasing levels of urgency to relocate or abort the block of data that is stored in the direct placement SSD.

9. The method of claim 8, wherein the host does not relocate or abort the block of data in response to the plurality of messages, if the host determines that exposure to uncorrectable data is preferable over a processing overhead to relocate or abort the block of data.

10. The method of claim 8, wherein the host does not relocate or abort the block of data in response to the plurality of messages, if the host determines that the host will overwrite the block of data within a predetermined amount of time.

11. A non-volatile memory device, comprising:
    a non-volatile memory; and
    a controller coupled to the non-volatile memory, wherein the controller is operable to:

transmit a message to a host, wherein the message indicates that at an opportune time the host should relocate or abort a block of data that is stored in the non-volatile memory; and receive, a command from the host, to relocate or abort the block of data stored in the non-volatile memory.

12. The non-volatile memory device of claim 11, wherein the controller is further operable to:

manage a plurality of media policies, wherein the message that is transmitted to the host is based on the media policies.

13. The non-volatile memory device of claim 12, wherein the controller is operable to:

determine from a media policy managed by the non-volatile memory that the block of data must be relocated or aborted as soon as possible; and indicate to the host, that the host must relocate or abort the block of data in the non-volatile memory as soon as possible.

14. The non-volatile memory device of claim 13, wherein the opportune time for the host is as soon as possible after receiving an indication that the host must relocate or abort the block of data in the non-volatile memory as soon as possible.

15. The non-volatile memory device of claim 12, wherein the controller is further operable to:

determine from a media policy that the block of data is to be relocated or aborted within a first amount of time; and indicate to the host, a second amount of time that is less than or equal to the first amount of time, wherein the host is expected to relocate or abort the block of data within the second amount of time.

16. The non-volatile memory device of claim 15, wherein the controller is further operable to:

in response to not receiving a command within the second amount of time, to relocate or abort the block of data stored in the non-volatile memory, transmit one or more additional messages to the host to request the host to relocate or abort the block of data within an additional amount of time.

17. The non-volatile memory device of claim 12, wherein the media policies include management of wear leveling, background data refreshing, limiting of read disturbs, limiting of error correcting code based correction of bits, and controlling of erase dwell time.

18. The non-volatile memory device of claim 11, wherein the controller is further operable to:

transmit a plurality of messages indicating an increasing levels of urgency to relocate or abort the block of data that is stored in the non-volatile memory.

19. The non-volatile memory device of claim 18, wherein the host does not relocate or abort the block of data in response to the plurality of messages, if the host determines that exposure to uncorrectable data is preferable over a processing overhead to relocate or abort the block of data.

20. The non-volatile memory device of claim 18, wherein the host does not relocate or abort the block of data in response to the plurality of messages, if the host determines that the host will overwrite the block of data within a predetermined amount of time.

21. A system, comprising:

a processing unit;

a display;

a non-volatile memory device comprising a non-volatile memory; and a controller coupled to the non-volatile memory, wherein the controller is operable to:

transmit a message to the processing unit, wherein the message indicates that at an opportune time the processing unit should relocate or abort a block of data that is stored in the non-volatile memory; and receive a command from the processing unit, to relocate or abort the block of data stored in the non-volatile memory.

22. The system of claim 21, wherein the controller is further operable to:

manage a plurality of media policies, wherein the message that is transmitted to the processing unit is based on the media policies.

23. The system of claim 22, wherein the controller is operable to:

determine from a media policy managed by the non-volatile memory that the block of data must be relocated or aborted as soon as possible; and indicate to the processing unit that the processing unit must relocate or abort the block of data in the non-volatile memory as soon as possible.

24. The system of claim 22, wherein the controller is further operable to:

determine from a media policy that the block of data is to be relocated or aborted within a first amount of time; and indicate to the processing unit, a second amount of time that is less than or equal to the first amount of time, wherein the processing unit is expected to relocate or abort the block of data within the second amount of time.

25. The system of claim 22, wherein the media policies include management of wear leveling, background data refreshing, limiting of read disturbs, limiting of error correcting code based correction of bits, and controlling of erase dwell time.

* * * * *